MONOSTABLE MULTIVIBRATOR EMPLOYING FOUR ZONE SEMICONDUCTIVE GATE IN SERIES WITH AT LEAST A TRANSISTOR

Filed July 2, 1959 2 Sheets-Sheet 1

INVENTORS
Clarence S. Jones
Frank P. Lewandowski

BY Harvey S. Lowhurst
ATTORNEY

MONOSTABLE MULTIVIBRATOR EMPLOYING FOUR ZONE SEMICONDUCTIVE GATE IN SERIES WITH AT LEAST A TRANSISTOR

Filed July 2, 1959 2 Sheets-Sheet 2

INVENTORS
Clarence S. Jones
Frank P. Lewandowski

BY Harvey S. Lambert [signature]
ATTORNEY

United States Patent Office 3,018,392

Patented Jan. 23, 1962

3,018,392

MONOSTABLE MULTIVIBRATOR EMPLOYING FOUR ZONE SEMICONDUCTIVE GATE IN SERIES WITH AT LEAST A TRANSISTOR

Clarence S. Jones, Los Altos, and Frank P. Lewandowski, Mountain View, Calif., assignors to General Precision Inc., Wilmington, Del., a corporation of Delaware Filed July 2, 1959, Ser. No. 824,581

26 Claims. (Cl. 307—88.5)

This invention relates to multivibrator circuits and, more particularly, to an improved multivibrator circuit having one stable and one quasi-stable state.

In a wide variety of electronic control systems that require rectangular or substantially rectangular trigger pulses, such as, for example, delay circuits, coincidence gates and blanking circuits, the customary practice has been to employ a multivibrator circuit as a pulse generating means. Although conventional multivibrators provide fairly stabilized trigger pulses, the utilization of these circuits is somewhat limited by the fact that their output impedance is high and that, therefore, only limited output power is available to drive or control further circuits. Additionally, conventional multivibrators require a large number of components resulting in complex circuits and bulky packages not readily miniaturized. Often a number of the required components are temperature sensitive, causing a variation of operation with change of temperature by introducing irregularities in the characteristics of the trigger pulses such as distortion in the wave form or variation in the pulse duration or amplitude. A further limitation of conventional multivibrators is that the recovery time is usually of the same order of magnitude as the length of the output pulses, making high speed operation impossible unless additional circuitry is provided to overcome this further limitation.

It is therefore a primary object of the present invention to provide a monostable multivibrator whose output impedance is smaller than that of conventional circuits.

It is another object of this invention to provide an improved monostable multivibrator trigger circuit whose operation is substantially independent of variations in temperature.

It is still another object of this invention to provide an improved monostable multivibrator circuit for either positive or negative output pulses in response to either positive or negative trigger pulses.

It is a further object of this invention to provide an improved monostable multivibrator circuit having less components than conventional circuits and being specially adaptable to miniaturization.

It is still another object of this invention to provide a single monostable multivibrator circuit whose recovery time is considerably faster than conventional circuits.

It is still a further object of this invention to provide an improved monostable multivibrator circuit which is less complex, less bulky, less temperature sensitive, faster and more reliable than conventional circuits.

Other objects and many of the attendant advantages of this invention will be readily appreciated as the same become better understood by reference to the following detailed description when considered in connection with the accompanying drawings wherein.

Figure 1:
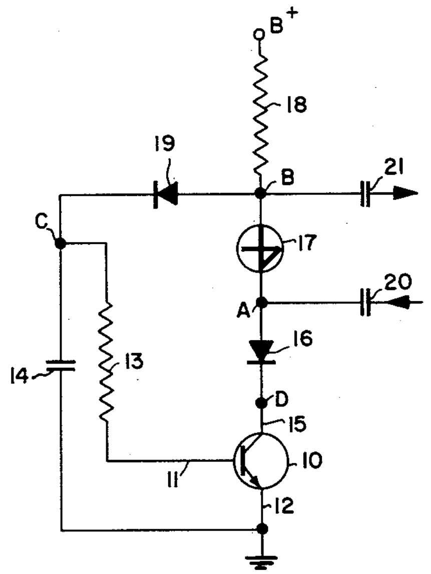
FIG. 1 is a schematic circuit diagram of a preferred embodiment of the circuit of this invention.
Figure 6:
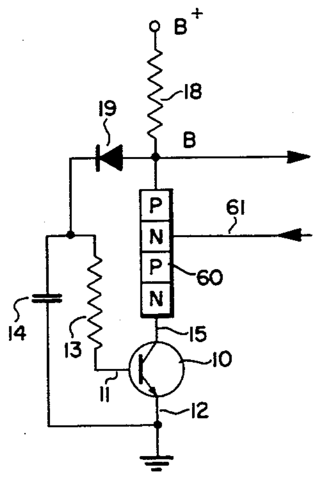

FIGS. *5a*, *5b* and *5c* are schematic circuit diagrams of further embodiments of the circuit of this invention;

FIG. 6 is a further schematic circuit diagram of the circuit of FIG. 1 showing utilization of a three-terminal PNPN diode; and FIGS. *7a* and *7b* are further schematic circuit diagrams of the circuits of FIGS. *5a* and *5c* showing utilization of an eleven-layer semiconductor body.

Briefly, the present invention accomplishes a number of its objects by utilizing a four-layer silicon PNPN semiconductor diode as a current switch. The output pulse is provided when the current switch conducts and permits a large current to flow through a load impedance. The current switch is made conductive by a trigger pulse. Once the current switch is conductive, an electronic valve such as a tube, transistor or relay takes over, and controls its return to the non-conductive state at a time determined by the time constant of an RC network.

Referring now to the drawings, and particularly to FIG. 1 thereof, NPN transistor 10 has its base electrode 11 connected to its grounded emitter electrode 12 via an RC circuit formed by a resistive impedance 13 and a capacitive impedance 14. The collector electrode 15 of transistor 10 is connected to a $B^+$ supply, referenced to ground, through a conventional PN diode 16, a two-terminal four-layer PNPN diode 17 and a resistive impedance 18. A conventional PN diode 19 connects junction B to junction C. A negative input or trigger pulse, for changing the state of the monostable multivibrator circuit of this invention from stable to quasi-stable, may be applied via an optional isolation capacitor 20 to junction A. Similarly, a negative output pulse may be derived, via optional isolation capacitor 21, from junction B.

Diode 17 is a silicon four-layer switching diode of the PNPN type and is a two-terminal device. Diode 17 is commonly referred to as a two-terminal four-layer PNPN diode or simply as a two-terminal PNPN diode and is fully described in an article entitled "The Four-Layer Diode" by W. Shockley in the August 1957 issue of Electronic Industries & Tele-Tech. Briefly, it operates in either of two states: an open or high-impedance state of 1 to 100 megohms, and a closed or low-impedance state of less than 9 ohms. PNPN diode 17 is switched from one state to the other by a voltage and current applied to the device. As the voltage is raised in the forward direction, the PNPN diode reaches a breakdown voltage and changes to the low-impedance, high-conductance condition, thereby "closing the circuit" between the two terminals. The circuit remains "closed" as long as the required holding current is maintained. If the current falls below this value, the device resumes its open or high-impedance condition. The turn-on time of diode 17 is usually less than 0.1 microsecond. A more detailed explanation of the four-layer diode may also be found in Patent No. 2,855,524, issued October 7, 1958, to Shockley on Semiconductor Switch.

Figure 2:
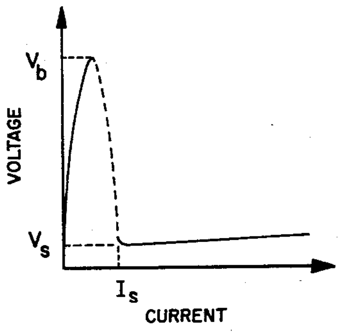
FIG. 2 is a graph showing the voltage-current characteristic of the four-layer PNPN diode of FIG. 1.

In FIG. 2, the voltage appearing across the terminals of diode 17 is plotted against the current flowing from junction B to junction A, FIG. 1. As increasing voltage is applied to the diode beginning from zero, low current flows during the high-impedance condition of diode 17 until the breakdown voltage $V_b$ is reached. There then follows an unstable negative resistance region (indicated by a dotted line portion) in the voltage-current characteristic. Next, there follows a region in which, although the current flow is appreciable, only a small voltage appears across diode 17. This is the low-impedance state of the diode. In this region, the major portion of the voltage applied (that is the $B^+$ voltage) is developed across resistor 18. After breakdown has been initiated, the breakdown condition will be sustained if there is maintained across PNPN diode 17 sufficient voltage $V_s$ to insure the flow of a sustaining current $I_s$. If the voltage applied is lowered beyond this value $V_s$, PNPN diode 17 returns to its state of high-impedance and remains in such state until the breakdown voltage $V_b$ is again reached.

Referring now to the circuit of FIG. 1, initial application of B+ voltage to load impedance 18 causes the flow of a base biasing current through load impedance 18, diode 19 (which is forward biased by B+ voltage), through base biasing impedance 13 into base electrode 11 of transistor 10. The impedance value of the serial combination of resistive impedances 18 and 13 is selected to provide sufficient base current to saturate transistor 10 so that it is biased "heavily on." Upon initial application of B+ potential, PNPN diode is in its stable high-impedance state so that point B is effectively isolated from the reference potential to which emitter electrode 12 is connected. Also, the impedance value of load impedance 18 is very much smaller than that of biasing impedance 13 so that point B is raised to very nearly B+ potential, differing therefrom only by the drop across load impedance 18 caused by base current flow.

As soon as transistor 10 is beginning to saturate, point D will assume the reference potential (ground) and carry the potential of point A with it. Otherwise point A would be forward biased and current would flow. The magnitude of the potential applied to load impedance 18 is carefully selected to be somewhat smaller than the breakdown potential of PNPN diode 17 so that, upon initial application of B+ voltage, PNPN diode 17 remains in its stable high-impedance state. Since point B is practically at B+ potential and since point C follows point B very closely, differing therefrom only by the voltage drop across PN diode 19, it is immediately apparent that capacitive impedance 14 is changed to a value very closely equal to B+ potential. The steady state potentials of various identified points are shown by the left-hand portions of curves 30, 31, 32 and 33, FIG. 3.

Figure 3:
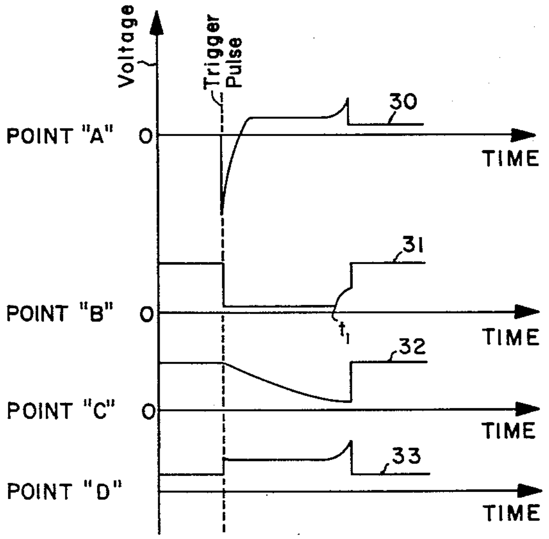
FIG. 3 is a chart showing variations with time of the voltages at various identified points in the circuit of FIG. 1.

Load current flow causes point B to drop to a potential very nearly equal to the reference potential (ground) because the impedance between point B and ground is very low. Of course, points A and D follow point B and differ therefrom only by the potential across transistor 10 and PN diode 16. Of course, as soon as point B drops to the reference potential (or very nearly so) PN diode 19 disconnects point C because PN diode 19 is now back biased. As a consequence thereof, base biasing current from B+ potential ceases entirely and capacitive impedance 14 commences to discharge exponentially through base biasing impedance 13. As is immediately apparent to those skilled in the art, capacitive impedance 14 becomes a voltage source supplying base current to keep transistor 10 saturated. Of course, capacitive impedance 14 only has a limited charge and, therefore, the base current will decrease exponentially until finally the base current is insufficient to maintain transistor 10 saturated. Curve 31, FIG. 3, shows that transistor 10 is saturated until a time $t_1$. This, in turn, decreases collector current (load current through load impedance 18) until eventually the collector current falls below the sustaining current $I_s$ and PNPN diode 17 reverts back to its high-impedance stable state. The variations in potential and various identified points in the circuit as a trigger is applied are shown by the remaining portions of curves 30, 31, 32 and 33, FIG. 3.

As is now easily seen, the time at which the monostable multivibrator reverts back to its stable state after the application of a trigger pulse depends entirely on the time it takes capacitive impedance 14 to discharge; that is on the time constant on the RC circuit comprising capacitor 14 and resistor 13. The larger the capacitor, the greater the time before the circuit resets itself. Also, it is seen that the RC circuit provides a current source which supplies base current as soon as point C is disconnected by point B. It may also be noted that the ratio of resistive values of resistive impedances 13 and 18 determines the recovery time of the circuit in relation to the pulse width of the output pulse. For example, if resistor 13 is 39 times as large as resistor 18 and the pulse width of the output pulse derived from point B is 39 milliseconds, the recovery time is only 1 millisecond. It is also apparent that PNPN diode 17 operates as a current switch having a quasi-stable conduction state and a stable high-impedance state.

The following table sets forth circuit and component values which have been found to be perfectly satisfactory for the operation of the circuit of FIG. 1. These values are intended to be exemplary only and are not to be interpreted in a limiting sense.

| | |
|---|---|
| Transistor **10** | General Electric 2N169. |
| PN diode **16** and **19** | Hughes 1N191. |
| PNPN diode **17** | Beckman/Helipot 4N30D. |
| Resistor **13** | 39 kiloohms. |
| Resistor **18** | 1000 ohms. |
| B+ potential | +28 volts. |
| Trigger pulse | −6 volts. |

Figure 4:
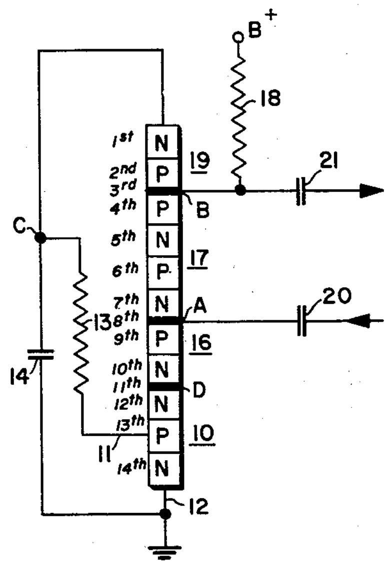
FIG. 4 is a further schematic circuit diagram of the circuit of FIG. 1 showing utilization of a 14-layer semiconductor body.

As mentioned hereinbefore, all semiconductor devices used in practising this invention are preferably of the silicon type. FIG. 4 shows a different component arrangement of the circuit of FIG. 1 wherein all semiconductor devices are arranged for minimum packaging. For the sake of simplicity, the same reference characters are used in FIG. 1 and FIG. 4 to designate like parts. It can be seen from FIG. 4 that the four semiconductor devices, namely two-terminal PNPN diode 17, NPN transistor 10, and the two PN diodes 16 and 19, may be arranged to provide an entirely new and novel semiconductor device. The new semiconductor shown in FIG. 4 has 14 zones in succession, namely an N-zone, P-zone, conductive-zone, P-zone, N-zone, P-zone, N-zone, conductive zone, P-zone, N-zone, conductive-zone, N-zone, P-zone, N-zone. The trigger input pulse is applied via capacitor 20, to the second conductive-zone which coincides with junction A. The output pulse is derived, via capacitor 21, from the first conductive-zone, which coincides with junction B.

A 14-zone semiconductor device such as the one shown in FIG. 4, can be manufactured to have physical dimensions of less than a ¼ inch length and a ⅛ inch diameter. Obviously, a monostable multivibrator built in accordance with the teachings of this specification and including a 14-layer semiconductor device, has tremendous advantages over conventional circuits in that it makes possible a degree of miniaturization heretofore thought unobtainable. Furthermore, reliability and ruggedness are greatly increased and the number of components is greatly decreased.

Figure 5A:
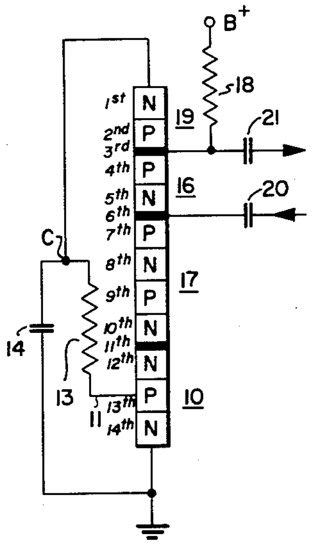
Figure 5B:
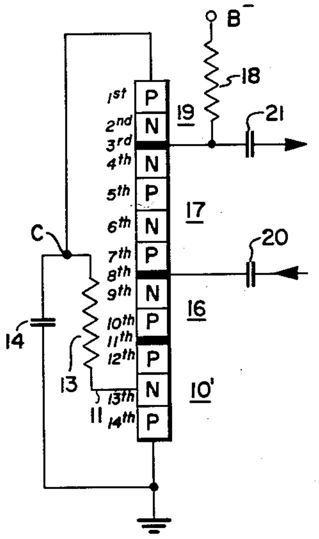
Figure 5C:
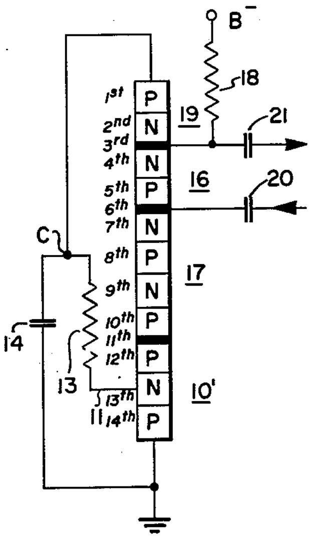

The circuit shown in FIGS. 1 and 4, including an NPN transistor, requires a positively-biased collector electrode. A negative input pulse must be applied to change the conduction state of diode 17 and a negative output pulse is obtained. The circuit of FIG. 4 may easily be modified to provide positive output pulses in response to a negative trigger pulse. As shown in FIG. 5*a*, the positions of diode 16 and PNPN diode 17 are exchanged so that a positive trigger pulse may be used to actuate PNPN diode 17 to become conductive. FIGS. 5*b* and 5*c* respectively illustrate further circuit modifications useful in deriving positive output pulses. NPN transistors 10 and B+ voltage are exchanged for PNP transistor 10' and B− voltage, and the terminals of diodes 16, 17 and 18 are reversed in a manner well-known to those skilled in the art. FIG. 5*b* shows a circuit responsive to negative trigger pulse to actuate a positive output pulse. FIG. 5*c* shows a circuit responsive to a positive trigger pulse to actuate a positive output pulse. Operation of the circuit of FIGS. 5*a*, 5*b* and 5*c* will be apparent from the previous explanation of FIG. 1 so that further description is believed to be unnecessary.

It appears appropriate at this time to note that the prime purpose of PN diode 16 in FIG. 1 (and the two layers of semiconductive material in FIGS. 4, *5a*, *5b* and *5c* generally indicated by reference character 16) is to facilitate the raising of the potential across two-terminal PNPN diode 17 (and the equivalent four layers in FIGS. 4, *5a*, *5b* and *5c*) to a value above the breakdown potential $V_b$. The presence of PN diode 16 makes point A a high-impedance input terminal so that little current is necessary to add the potential supplied by the trigger pulse to the potential of point A. The combination of two-terminal PNPN diode 17 and PN diode 16 may be replaced with a three-terminal PNPN diode having a "gate" electrode coupled to one of the two inner semiconductive layers to which the trigger pulse may be directly applied.

Three-terminal four-layer PNPN diodes are marketed by Solid State Products, Inc. under the name of "Silicon PNPN Controlled Switch" and operate in exactly the same manner as the two-terminal PNPN diode for voltages and currents applied between the two end terminals. That is, the three-terminal PNPN diode breaks down and becomes highly-conductive upon the application of a potential exceeding $V_b$, the breakdown potential, and remains in the highly-conductive state until the current flowing from one end terminal to the other falls below the sustaining current $I_s$. In addition to initiating the low-impedance state by applying a potential exceeding $V_b$ across the three-terminal PNPN diode, such a diode may also be made conductive by the application of a small negative trigger pulse to the third or "gate" electrode when the same is coupled to the intermediate N-zone or by applying a small positive trigger pulse to the "gate" electrode when the same is coupled to the intermediate P-zone. In other words, the three-terminal PNPN diode may be made conductive either by the application of a breakdown potential across the end-terminals or the application of a trigger pulse to the "gate" electrode. The main advantage of utilizing the three-terminal PNPN diode is the fact that a trigger pulse of less than one-half of a volt is sufficient to cause the desired breakdown and initiation of the conductive state and that the isolation diode, such as diode 16, may be dispensed with altogether. Another advantage is that a circuit incorporating a three-terminal PNPN diode does not require the application of a voltage anywhere near $V_b$ across the end terminals; all that is required is a potential greater than $V_s$ to provide the necessary sustaining current to keep the PNPN diode conducting until the current value causes it to diminish.

Referring now to FIG. 6, a three-terminal PNPN diode 60 has its two end terminals connected to point B and collector electrode 15 of transistor 10. The remainder of the circuit is the same as that of FIG. 1 and, for that reason, the same reference characters are used to designate like parts. The trigger pulse is applied to "gate" electrode 61 which is shown connected to the intermediate P-zone. For this reason, the trigger pulse must be negative. The circuit may also be operated with a positive trigger pulse by connecting "gate" electrode 61 to the intermediate N-zone. If it is desired to provide an output signal which becomes more positive when the circuit is triggered, a PNP transistor 10' may be substituted for NPN transistor 10 and a $B^-$ may be used as the voltage source. Of course, since current flows towards the negative source, PNPN diode 60 must be reversed; that is, its anode (P-zone) is connected to collector electrode 15 and its cathode (N-zone) is connected to junction B.

The terminology here adopted with regard to the end terminals of a PNPN diode is the same commonly used in connection with PN diodes. Current flows from the anode to the cathode (opposite to electron flow) so that the P-zone forming one end-terminal connection is the anode and the N-zone forming the other end terminal connection is the cathode. Operation of the circuit of FIG. 6 is the same as that of FIG. 1 so that a further description is believed to be unnecessary. The only difference in operation is that a very small trigger voltage may be employed to trigger the circuit of FIG. 6 and that it is not necessary to use a $B^+$ or $B^-$ supply voltage which has a magnitude nearly equal to that of the breakdown potential $V_b$ of the PNPN diode.

The circuits shown in FIGS. *7a* and *7b* employ a new and novel compounded semiconductor device having 11 zones in succession. Using a shorthand notation where P stands for P-zone, N stands for N-zone and C stands for conductive-zone, the circuit of FIG. *7a* utilizes a PNCNPNPCPNP semiconductor device and the circuit of FIG. *7b* utilizes an NPCPNPNCNPN semiconductor device. All other circuit components are the same as described in connection with FIG. 1 and, therefore, the same reference characters are retained. The monostable multivibrator of FIG. *7a* provides a steady state output signal substantially equal to $B^-$ potential, which is raised to substantially zero potential when the circuit is triggered. The monostable multivibrator of FIG. *7b* provides a steady state output signal substantially equal to $B^+$ potential which drops to substantially zero potential when the circuit is triggered. Both circuits may be triggered with a positive pulse applied to input terminal 71 which corresponds to the "gate" electrode. To trigger the circuit with a negative pulse, input terminal 71 must be connected to the N-zone lying between the two conductive-zones. The operation of the circuits of FIGS. *7a* and *7b* will be readily understood in connection with the description of the operation of FIGS. 1 and 6, and further explanation is believed to be unnecessary.

Even though transistor 10 has been selected as being exemplary of a suitable current valve, it is to be understood that an electronic tube (thermionic) may be used in practicing the invention. Transistors are usually preferred because of their small voltage drop and large current carrying capacity.

Figure 7A:
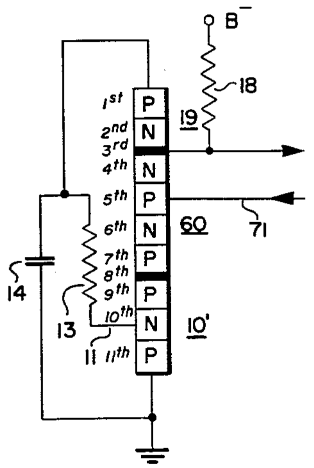
Figure 7B:
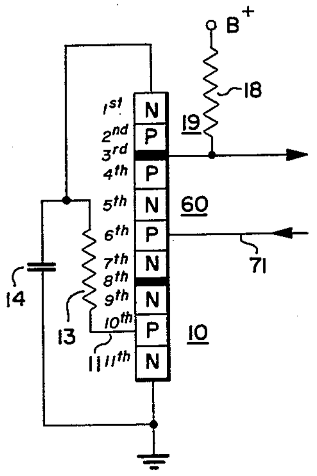

There has been described several embodiments of a monostable multivibrator which requires no more than seven conventional components for satisfactory operation; namely one transistor, one two-terminal PNPN diode, two PN diodes, two resistors and one capacitor. Use of a three-terminal PNPN diode reduces the number of components to six. If the circuit includes either the fourteen-layer or the eleven-layer semiconductor device described in FIGS. 4, 5 and 7, the total number of components is reduced to four. The recovery time is approximately equal to the ratio of the impedances of resistor 13 to resistor 18 times the pulse width of the output pulse. Since all semiconductor devices in this circuit may be of the silicon type, improved temperature stability is provided. Also, greatly improved power output is realized by use of a low output impedance.

Although there has been described an invention with a certain degree of particularity, it is understood that the present disclosure has been made only by way of example and that numerous changes in the details of construction and combination and arrangement of parts may be resorted to without departing from the spirit and the scope of the invention as hereafter claimed.

What is claimed is:

1. A monostable multivibrator comprising: a transistor having base, collector and emitter electrodes; a four-layer PNPN switching diode; a first unidirectional current conducting means serially coupled to said switching diode and defining therewith a circuit element having first and second terminal electrodes, said first terminal electrode being connected to said collector electrode; circuit input means for applying an operating pulse coupled to said circuit element intermediate between said PNPN switching diode and said first unidirectional current conducting means; a first resistive impedance means; a source of voltage referenced to said emitter electrode having its output terminal connected to said second terminal electrode through said first impedance means; a second resistive impedance means connected to said base electrode; a capacitive impedance means connected to said emitter electrode; and a second unidirectional current conducting means for connecting said second terminal electrode to said second and third impedances.

2. A monostable multivibrator comprising: a transistor having base, collector and emitter electrodes; a first diode means having first and second terminals; a load impedance means; a source of voltage referenced to said emitter electrode having its output terminal connected to the first terminal of said first diode means through said load impedance means; a resistive and a capacitive impedance means connecting the second terminal of said first diode means respectively to said base electrode and said emitter electrode; a four-layer PNPN switching diode; a second diode means serially connected to said switching diode, the combination of said switching diode and said second diode means connecting the first terminal of said first diode means to said collector electrode; circuit input means for applying an operating pulse coupled intermediate to said switching diode and said second diode; and circuit means for utilizing an output pulse coupled to said first terminal of said first diode means.

3. Apparatus according to claim 2 wherein the resistance value of said second impedance means is substantially greater than the resistance value of said first impedance means.

4. A monostable multivibrator comprising: an electronic valve having control, first and second electrodes; a first unidirectional current conduction means; a first and a second impedance connecting one terminal of said first rectifier means to said control electrode and said first electrode respectively; a third impedance; a source of voltage referenced to said first electrode connected to the other terminal of said first rectifying means through said third impedance means, the potential applied by said source being sufficient to limit current flow between said first and said second electrode; and the serial combination of a second rectifier means and a semiconductor body having four zones in succession for defining three rectifier junctions, said combination connecting said third impedance to said second electrode.

5. A monostable multivibrator comprising: a first transistor having base, collector and emitter electrodes; an RC current source including a resistor and a capacitor respectively connected to said base electrode and to said emitter electrode; an impedance means; a voltage source referenced to said emitter electrode and having its output terminal coupled to said impedance means; diode means coupling said impedance means to said RC current source, said diode means connecting said RC current source to said voltage source when forward-biased and disconnecting said RC current source from said voltage source when back-biased; a PNPN switching diode; and a PN rectifying diode serially connected to said switching diode, said serially connected switching and rectifying diode coupling said impedance means to said collector electrode.

6. A circuit comprising: a PNPN diode having a stable high-impedance state and a quasi-stable low-impedance state; first circuit means coupled to said PNPN diode for impressing a voltage pulse across said PNPN diode of a sufficient magnitude to cause said PNPN diode to assume its quasi-stable low-impedance state and to initiate a current flow therethrough; and second circuit means coupled to said PNPN diode for decreasing the magnitude of said current flow after a predetermined interval of time.

7. A circuit comprising: a four-layer semiconductor device having a stable high-impedance state and a quasi-stable low-impedance state, said device changing to its quasi-stable state upon the application of a voltage above a predetermined minimum value and reverting back to its stable state when the current therethrough drops below a predetermined minimum value; first circuit means coupled to said device for applying a pulse of voltage above said predetermined minimum voltage value across said device; second circuit means coupled to said device for controlling the length of time of current flow above said predetermined minimum current value through said device.

8. A circuit according to claim 7 wherein said second circuit means includes an electronic valve and an RC network.

9. A circuit according to claim 7 wherein said second circuit means includes a transistor having base, collector and emitter electrodes, and an RC network connecting said base electrode to said emitter electrode, and wherein said collector electrode is coupled to said semiconductor device.

10. A monostable multivibrator circuit for providing negative output pulses from a circuit output terminal in response to negative pulses applied to a circuit input terminal and comprising: a first diode having an anode and a cathode; a four-layer PNPN diode having a first and a second terminal electrode, said first terminal electrode and the anode of said first diode being connected to said circuit output terminal; a second diode having an anode and a cathode, the anode of said second diode and said second terminal electrode being connected to said circuit input terminal; an NPN transistor having base, collector and emitter electrodes, said collector electrode being coupled to the cathode of said second diode; a first resistive impedance; a positive source of voltage referenced to said emitter electrode having its output terminal connected to said circuit output terminal through said first resistive impedance; a second resistive impedance connecting the cathode of said first diode to said base electrode; and a capacitive impedance connecting the cathode of said first diode to said emitter electrode.

11. A monostable multivibrator circuit for providing negative output pulses from a circuit output terminal in response to positive pulses applied to a circuit input terminal and comprising: a first diode having an anode and a cathode; a second diode having an anode and a cathode, the anode of said first diode and the anode of said second diode being connected to said circuit output terminal; a four-layer PNPN diode having a first and a second terminal electrode, the cathode of said second diode and said first terminal electrode being connected to said circuit input terminal; an NPN transistor having base, collector and emitter electrodes, said collector electrode being coupled to said second terminal electrode; a first resistive impedance; a positive source of voltage referenced to said emitter electrode having its output terminal connected to said circuit output terminal through said first resistive impedance; a second resistive impedance connecting the cathode of said first diode to said base electrode; and a capacitive impedance connecting the cathode of said first diode to said emitter electrode.

12. A monostable multivibrator circuit for providing positive output pulses from a circuit output terminal in response to positive pulses applied to a circuit input terminal and comprising: a first diode having an anode and a cathode; a four-layer PNPN diode having a first and a second terminal electrode, said first terminal and the cathode of said first diode being connected to said circuit output terminal; a second diode having an anode and a cathode, the cathode of said second diode and said second terminal electrode being connected to said circuit input terminal; a PNP transistor having base, collector and emitter electrodes, said collector electrode being coupled to the anode of said second diode; a first resistive impedance; a negative source of voltage referenced to said emitter electrode having its output terminal connected to said circuit output terminal through said first resistive impedance; a second resistive impedance connecting the anode of said first diode to said base electrode; and a capacitive impedance connecting the anode of said first diode to said emitter electrode.

13. A monostable multivibrator circuit for providing positive output pulses from a circuit output terminal in response to negative pulses applied to a circuit input terminal and comprising: a first diode having an anode and a cathode; a second diode having an anode and a cathode, the cathode of said first diode and the cathode of said second diode being connected to said circuit output terminal; a four-layer PNPN diode having a first and a second terminal electrode, said first terminal electrode being connected to said circuit input terminal; a PNP transistor having base, collector and emitter electrodes, said collector electrode being coupled to said terminal electrode; a first resistive impedance; a negative source of voltage referenced to said emitter electrode having its output terminal connected to said circuit output terminal through said first impedance; a second resistive impedance connecting the anode of said first diode to said base electrode; a capacitive impedance connecting the anode of said first diode to said emitter electrode.

14. A monostable multivibrator comprising: a semiconductor device including at least a P-zone, N-zone, P-zone, and N-zone in succession and having first and second current terminals and a control terminal, said semiconductor device having a stable high-impedance state and a quasi-stable unidirectional low-impedance state, said quasi-stable low-impedance state being initiated by a trigger pulse applied to said control terminal and being maintained by said semiconductor device until current flowing therethrough drops below a characteristic minimum value; circuit input means coupled to said control terminal for applying said trigger pulse to initiate said quasi-stable state; a load impedance; a transistor having base, emitter and collector electrodes, said collector electrode being coupled to said first current terminal; a source of voltage referenced to said emitter electrode having its output terminal coupled to said second current terminal through said load impedance; a base biasing impedance coupled to said base electrode; a unidirectional current conducting means coupling said source of voltage to said base biasing impedance; and a capacitive impedance connected to discharge through said base biasing impedance when said unidirectional current conducting means becomes back biased by the application of said trigger pulse.

15. Apparatus in accordance with claim 14 wherein said semiconductor device comprises a two-terminal PNPN diode serially coupled to a PN diode and wherein said control electrode is coupled between said PNPN diode and said PN diode.

16. Apparatus in accordance with claim 14 wherein said semiconductor device comprises a three-terminal PNPN diode and wherein said three terminals correspond to said first current, second current and control terminals.

17. A semiconductor body for use with a monostable multivibrator having eleven zones in succession and including nine semiconductive-zones and two conductive-zones for defining six rectifying junctions, said semiconductor body having terminal electrodes coupled to the first, third, tenth and eleventh zones, and at least to one of the fifth and sixth zones.

18. A semiconductor body in accordance with claim 17 wherein the first, fifth, seventh, ninth and eleventh zones are P-zones; the second, fourth, sixth and tenth zones are N-zones; and the third and eighth zones are conductive-zones.

19. A semiconductor body in accordance with claim 17 wherein the second, fourth, sixth and tenth zones are P-zones; the first, fifth, seventh, ninth and eleventh zones are N-zones; and the third and eighth zones are conductive-zones.

20. A monostable multivibrator comprising: a semiconductor body having fourteen zones in succession and including eleven semiconductive-zones and three conductive zones for defining seven rectifying junctions, said semiconductor body having terminal electrodes connected to the first, third, thirteenth and fourteenth zones and to the second conductive-zone; a load impedance; a source of voltage referenced to the terminal electrode connected to said fourteenth zone having its output terminal coupled to the electrode connected to said third zone through said load impedance; a biasing impedance for coupling the electrode connected to said first zone to the electrode connected to said thirteenth zone; a capacitive impedance for coupling the electrode connected to said first zone to the electrode connected to said fourteenth zone; and circuit input means for applying a trigger pulse to the electrode connected to the second conductive-zone.

21. A semiconductor body for use with a monostable multivibrator having fourteen zones in succession and including eleven semiconductive-zones and three conductive-zones for defining seven rectifying junctions, said semiconductor body having terminal electrodes coupled to the first, third, thirteenth and fourteenth zones and to the second of said three conductive-zones.

22. A semiconductor body in accordance with claim 21 wherein the first, fifth, seventh, tenth, twelfth and fourteenth zones are P-zones; the second, fourth, sixth, ninth and thirteenth zones are N-zones; and the third, eighth and eleventh zones are conductive-zones.

23. A semiconductor body in accordance with claim 21 wherein the first, fifth, eighth, tenth, twelfth and fourteenth zones are P-zones; the second, fourth, seventh, ninth and thirteenth zones are N-zones; and the third, sixth and eleventh zones are conductive-zones.

24. A semiconductor body in accordance with claim 21 wherein the second, fourth, sixth, ninth and thirteenth zones are P-zones; the first, fifth, seventh, tenth, twelfth and fourteenth zones are N-zones; and the third, eighth and eleventh zones are conductive-zones.

25. A semiconductor body in accordance with claim 21 wherein the second, fourth, seventh, ninth and thirteenth zones are P-zones; the first, fifth, eighth, tenth, twelfth and fourteenth zones are N-zones; and the third, sixth and eleventh zones are conductive-zones.

26. A monostable multivibrator comprising a four-layer diode, a three-layer transistor and a two-layer diode, said transistor and said diodes being stacked together into a single body with conductive layers connecting therebetween, input means coupled to the four-layer diode for passing a voltage pulse to render the four-layer diode conductive, and timing means associated with the transistor for biasing the transistor into non-conduction after a time interval.

References Cited in the file of this patent

UNITED STATES PATENTS

| | | |
|---|---|---|
| 2,884,607 | Uhlir | Apr. 28, 1959 |
| 2,890,353 | Van Overbeek | June 9, 1959 |
| 2,906,926 | Bauer | Sept. 29, 1959 |
| 2,915,650 | Williams | Dec. 1, 1959 |

FOREIGN PATENTS

| | | |
|---|---|---|
| 166,800 | Australia | Feb. 6, 1956 |